Patented Oct. 1, 1929

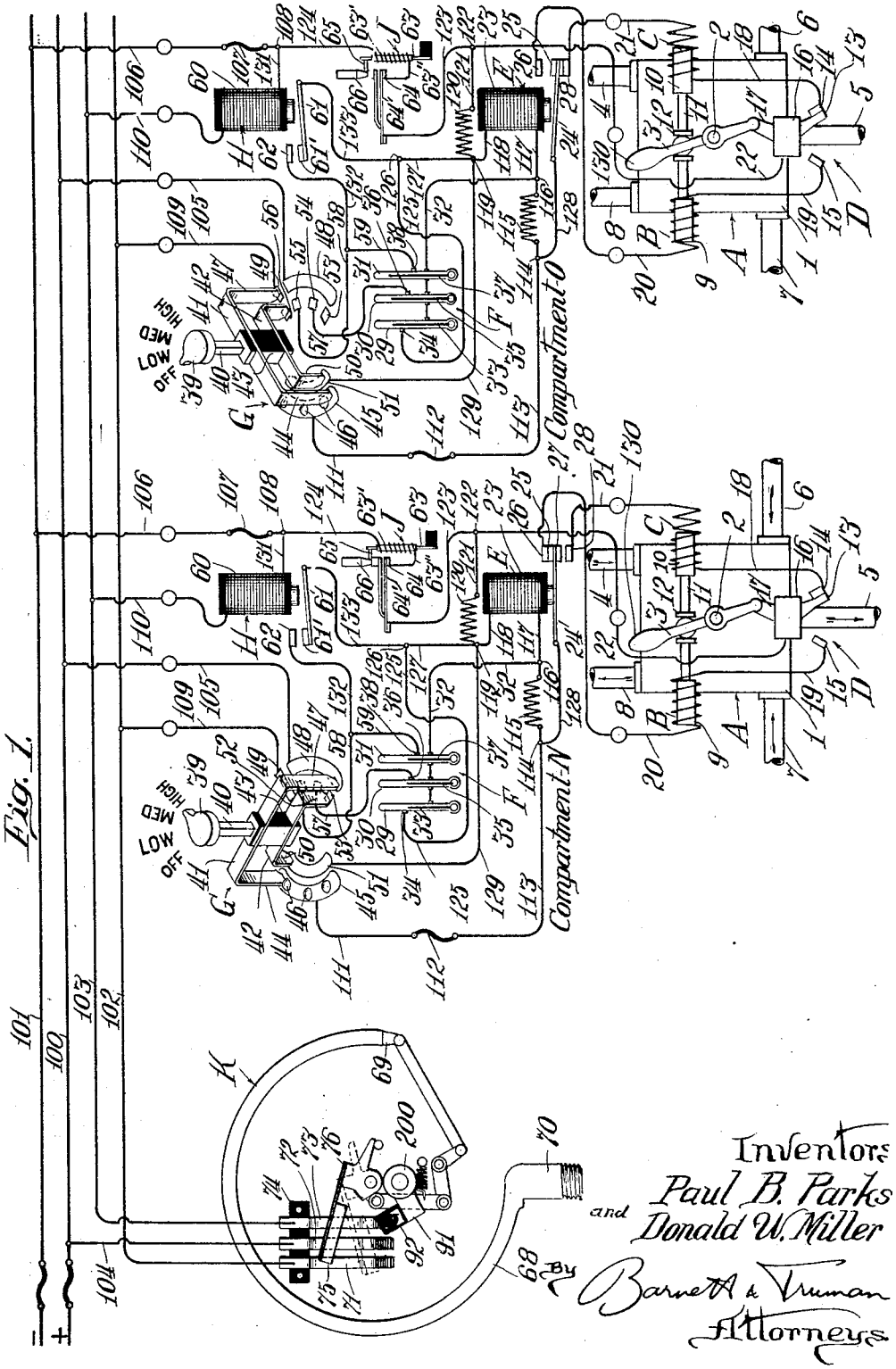

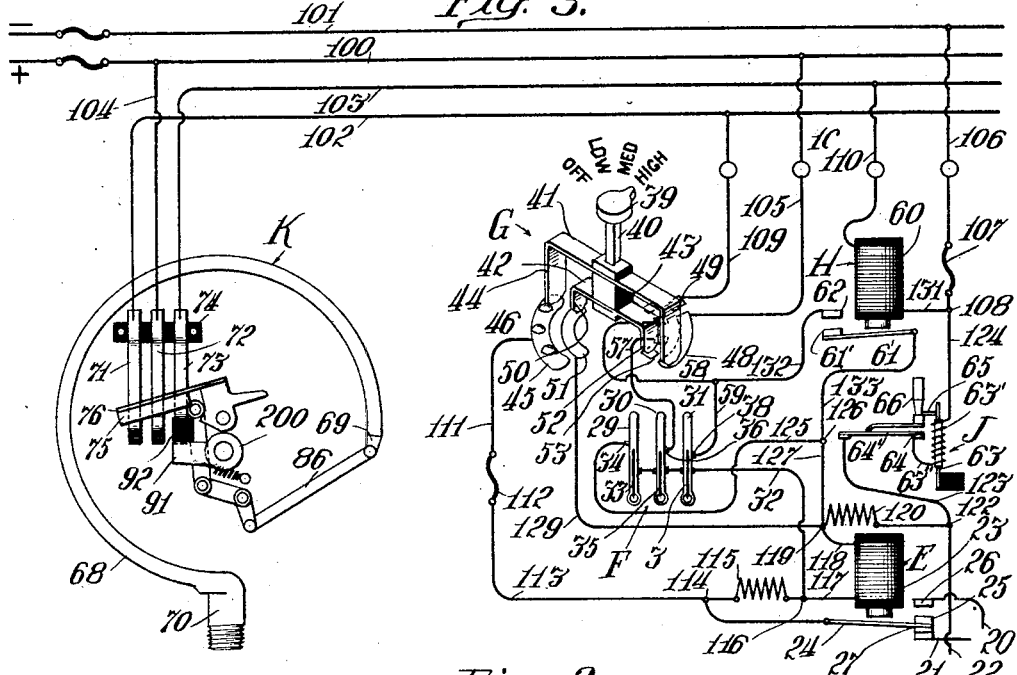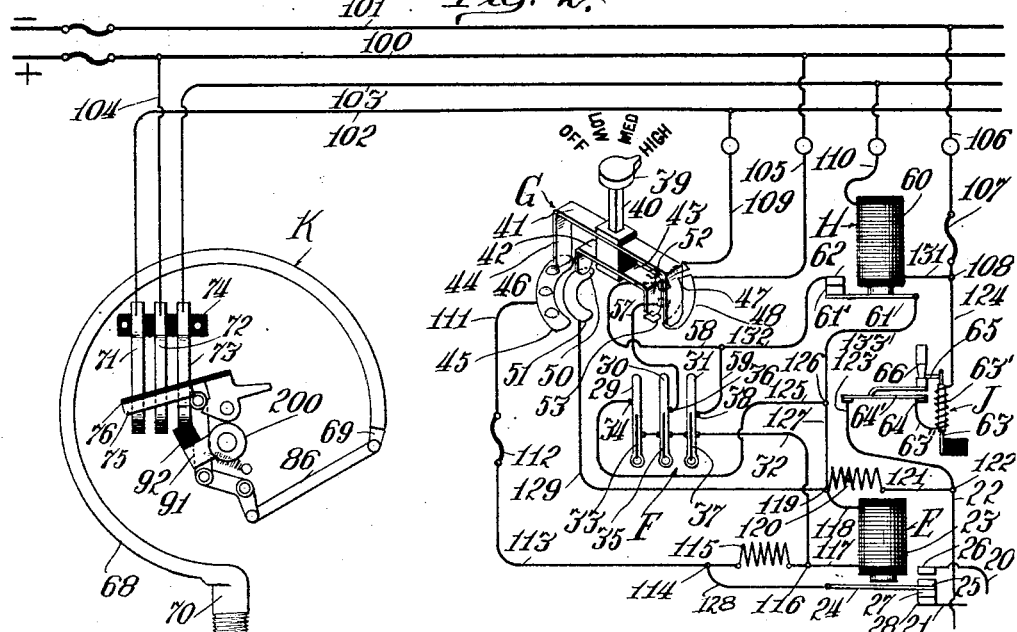

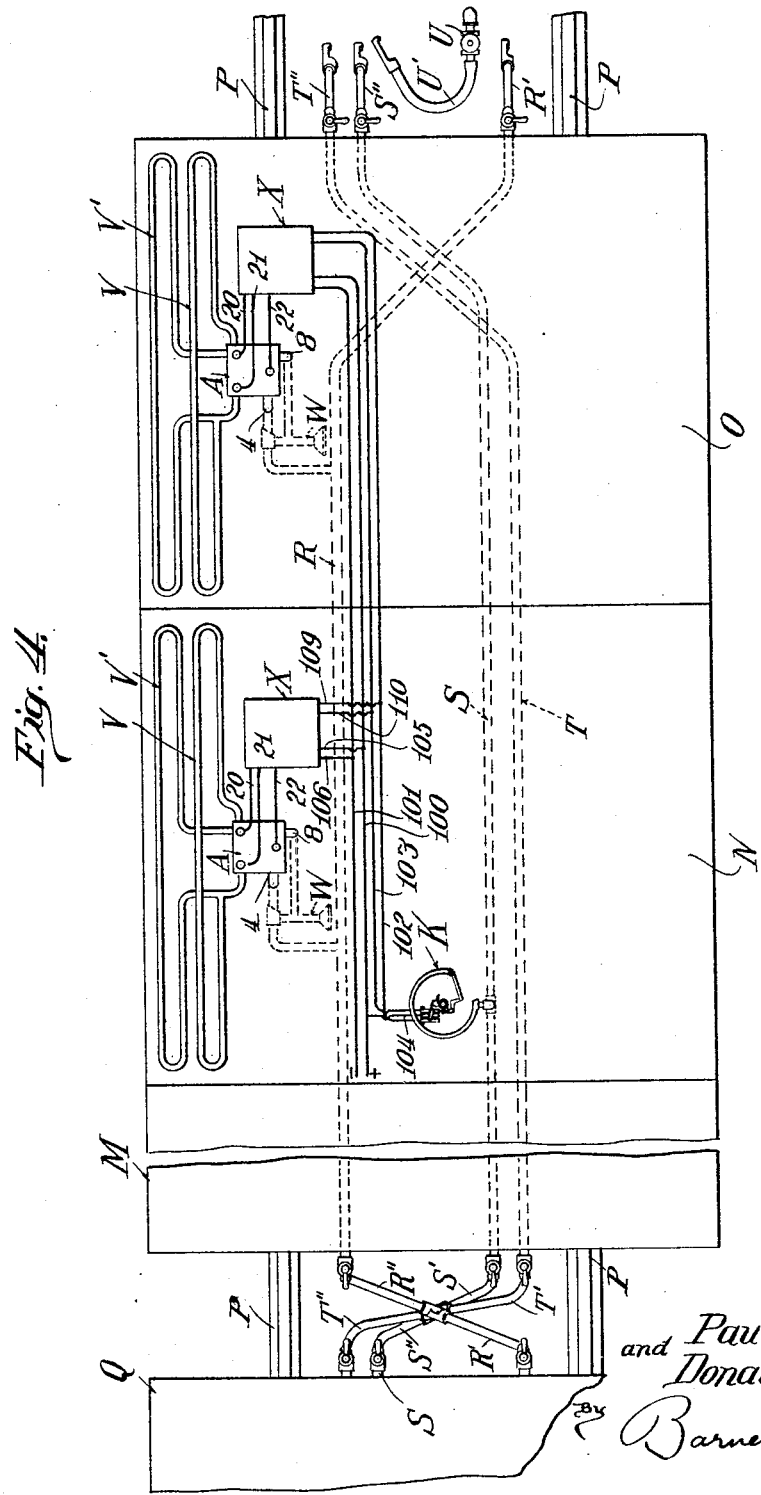

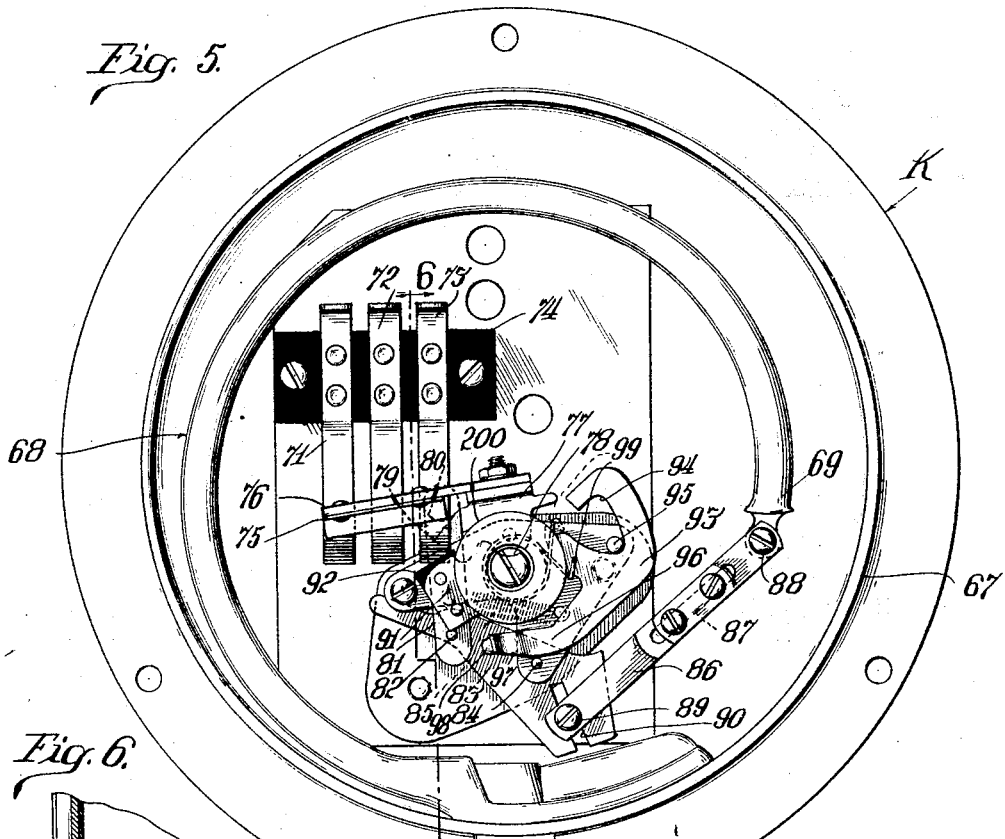

1,729,748

UNITED STATES PATENT OFFICE

PAUL B. PARKS, OF OAK PARK, AND DONALD W. MILLER, OF ELMHURST, ILLINOIS, ASSIGNORS TO VAPOR CAR HEATING COMPANY, INC., OF CHICAGO, ILLINOIS, A CORPORATION OF NEW YORK

REGULATING APPARATUS FOR CAR-HEATING SYSTEMS

Application filed February 2, 1927. Serial No. 165,392.

This invention relates to a regulating apparatus for a car heating system, and more particularly to a system capable of maintaining the several separate compartments of a railway car at temperatures desirable or necessary under a variety of different conditions.

Ordinarily it is desirable that each entire compartment when in service may be maintained at a relatively high temperature, or at one of a plurality of selected temperatures, and it is desirable that the temperature of each compartment may be separately regulated as desired or found necessary. However, when the car is out of service, as when cut off from the locomotive, and supplied with heating medium from a yard or terminal steam line, a relatively low temperature in all of the compartments is sufficient. This temperature need only be high enough to prevent freezing of the pipes, or other damage to the car structure, and a considerable saving of fuel is thus accomplished as the car is apt to be out of service a large portion of the time. It is also desirable to provide means, whereby the control system for each compartment can be thrown out of operation entirely to permit the individual manual operation of the radiator valves, in view of possible failure of the automatic system to properly function under extreme or unusual conditions. However, if the car were sent to the yards, or otherwise left out of service when this automatic control system is thus thrown out of operation, the car might be over-heated or deprived of heat entirely according to the positions in which the radiator valves were left by the train crew.

The present invention provides apparatus whereby the heating system is automatically placed under the low temperature control when the car is out of service, regardless of the position of the manual temperature selector, or cut-out means in each compartment.

One object of this invention is to provide means whereby the automatic temperature maintaining apparatus may be set to maintain any one of a plurality of selected temperatures, or can be entirely thrown out of operation, when the car is in service, without affecting the automatic means for maintaining the compartment at the relatively low temperature necessary to prevent injury to the car structure when the car is out of service.

Another object is to provide means in such a system whereby the car compartment can be maintained at a higher selected temperature when the car is out of service, even though the system has been rendered inoperative while the car was in service.

Another object is to provide a heating system for a plurality of separate compartments in a railway car, whereby the temperature of each compartment is individually controllable when the car is in service, but all of the compartments are automatically maintained at the selected low temperature when the car is out of service.

Another object is to provide such a system wherein the automatic control system in any one or more of the compartments may be rendered inoperative while the car is in service, such means being ineffective to prevent the automatic operation of the low temperature regulating mechanism when the car is out of service.

Another object is to provide such a system wherein the automatic low temperature regulating means may be rendered temporarily inoperative so as to permit the compartment to be maintained at a higher selected temperature when the car is out of service.

Another object is to provide a new and improved form of duplex manual control switch, operable in each compartment of the railway car for manually determining the selected operation of the control system therein.

Numerous other objects and advantages of this invention will be apparent from the following detailed description of one approved form of the apparatus.

In the accompanying drawings:

Fig. 1 is a diagrammatic representation of the control system as applied to the steam heating systems for two adjacent compartments of a railway car.

Figs. 2 and 3 are similar views of a portion of the control system for one of the compartments, under different operating conditions.

Fig. 4 is a diagrammatic view illustrating the installation of the heating system and its regulating means on a railway car.

Fig. 5 is an elevation of the automatic selector switch.

Fig. 6 is a vertical section taken substantially on the line 6—6 of Fig. 5.

Fig. 7 is a plan view, partially broken away, of portions of the manual control switch.

Referring first to Fig. 4, M is a railway car (shown partly broken away), divided into a series of separate compartments, two of which are indicated at N and O. The car is supported on and movable along the tracks P. Car M is here shown as connected in service as a unit of a train, it being the last car in the train and connected to a preceding car, or the locomotive, indicated at Q. On each car is a steam supply pipe R, having coupling connections R′ and R″ at the respective car ends, whereby the several supply pipes R on the different cars may be connected together in series to form a continuous steam supply pipe extending from the locomotive throughout the length of the train. Similarly, the air signal line pipe S and the air brake line pipe T, having connections S′, S″ and T′, T″ at their respective ends, are mounted on each car. Valves are provided at the end of each train pipe, whereby the unconnected ends at the rear end of the train can be closed to maintain the pressure.

When a car is disconnected from a train, the air lines S and T are left open and air pressure in each is dissipated. At such times, in order to supply steam to the steam line pipe R, whereby the compartments in the car may be heated, one end coupling, such as R′ may be connected with a similar coupling U′ leading from a steam supply pipe U in the train yards.

Each compartment in the car is provided with radiators, such as V and V′, to which steam is supplied through control valve A, from a pipe 4 leading from supply pipe R, as hereinafter described in detail. The return steam flows back through pipe 8 to the vapor regulator W. Each compartment has a separate electrical control system for the valve A, indicated diagrammatically at X, in Fig. 4, the parts of which are shown in detail in Figs. 1, 2 and 3 and described more in detail hereinafter. At some convenient location on the car is mounted a selector switch K, which is subject to the pressure changes in one of the air train lines on the car. It is here shown as operating from the air signal line S, but could be similarly operated from the brake line T. The switch K, or its equivalent, could be controlled from or connected with any power or signal line on the car, whether fluid pressure, electrical or mechanical, it only being necessary that this line change its condition or position when the car is detached from the train or taken out of service. Furthermore, electricity or other source of power might be used in lieu of steam for heating purposes, without necessitating any material changes in the control system hereinafter described.

Referring now to Fig. 1, two separate units are illustrated more in detail for controlling two of the separate compartments of the railway car, such as the compartments N and O, already referred to. It is to be understood that any desired number of compartments may be similarly heated and controlled, and that the installation in each compartment will be a duplication of that here shown in either of the compartments N or O. A radiator valve A is provided in each compartment for controlling the flow of steam from the steam train line R to the radiators V or V′ in that compartment. Electric motors B and C control the position of the valve A, and limit switch D cuts off the flow of electric current to the respective motors B and C after each has performed its function. The relay E selectively directs the flow of electric current to the operating motors B or C. The system of thermostats indicated at F accomplish the automatic regulation of the compartment temperature at different selected temperatures. By means of the manual control switch G, the occupant of the compartment, or a member of the train crew, may select the desired temperature to be maintained in that compartment or can throw the entire control system out of operation, so long as the car is connected in service as a unit of a train. The relay H forms a portion of the mechanism for automatically maintaining the compartment at the low temperature when the car is out of service. A thermally operated safety switch is indicated at J, adapted under abnormal conditions to break the circuit to the operating devices and prevent injury thereto through overheating. All of the above mentioned group of devices, from A to J inclusive, are duplicated in each separate compartment and form the principal elements of the temperature control system for that compartment. The selector switch K, already described, operates in conjunction with the relay H to control the automatic maintenance of the low temperature when the car is out of service. This selector K is mounted at some convenient position on the car and controls the several individual regulating systems for the several separate compartments. Some of these separate devices will now be described more in detail, after which the wiring of the system and its operation under different conditions will be described.

The valve A comprises a casing 1, in which is a rotatable valve part controlled by the rock shaft 2, on which is secured the operating lever 3. With the valve in the position shown in compartment N of Fig. 1, steam will flow in through pipe 4 from the steam supply line R and thence to the radiators through inlet pipe 5. The steam will return from the different coils of the radiators through the return pipes 6 and 7, thence through passages in the valve to the pipe 8, through which it passes to the vapor regulator W. When the valve A is in the "off" position, the steam passes directly from pipe 4 to pipe 8 and does not traverse the radiator coils. All of the above is more clearly shown and described in several prior patents, for example the patent to Russell 1,440,701 granted January 2, 1923.

Each of the motors B and C is here shown as a solenoid, the cores 9 and 10 of which are connected by a rod 11, having a central pivotal connection at 12 with one arm of the valve operating lever 3. When solenoid B is energized, its core 9 will be drawn therein and will throw the valve to the "on" position shown in compartment N of Fig. 1, and when motor C is energized the movement of its core 10 will throw the valve to the "off" position. Limit switch D is illustrated as including a swinging contact member 13, adapted to be held in alternative engagement with either of the fixed contacts 14 or 15, by means of the snap switch mechanism enclosed in casing 16, and operated by means of lever 17 from one end of the valve lever 3. Fixed contact 14 is connected by wire 18 with one end of the coil of solenoid C, and in the same manner fixed contact 15 is connected by wire 19 with one end of solenoid coil B. Three control wires extend to the valve operating mechanism, the wires 20 and 21 connecting respectively with the other ends of solenoid coils B and C, and the third wire 22 extending to the movable contact 13 of limit switch D. This limit switch is adapted to cut off the supply of current to either of the operating solenoids B or C after that solenoid has functioned to move the valve A. Accordingly, the snap mechanism indicated diagrammatically at 16 operates in a well known manner to swing the movable contact 13 quickly from contact 14 to contact 15, or vice versa, as the valve operating lever 3 approaches the end of one of its swinging movements.

The relay E comprises an electro-magnet 23, which when energized will hold up the pivoted armature 24 so that movable contact 25 carried by the armature is in contact with the fixed contact member 26. When the coil 23 is de-energized, the armature 24 will drop so that movable contact 27 carried by the armature 24 will engage the fixed contact 28.

The thermostatic control system F comprises three (or more) separate similar thermostats, preferably of the mercurial type. The high temperature thermostat is indicated at 29, the intermediate temperature thermostat at 30, and the low temperature thermostat at 31. One lead 32 of the electrical control system is always in contact with the mercury columns of all three of these thermostats. At a certain selected temperature, for example 72° Fahrenheit, the mercury column 33 of high temperature thermostat 29 will encounter a contact member 34 in the upper portion of the mercury tube and complete a circuit through this thermostat. At a somewhat lower temperature, for example, 70° Fahrenheit, the mercury column 35 of intermediate thermostat 30 will engage the contact member 36 and complete its circuit through this thermostat. Similarly, the mercury column 37 of low temperature 31 will engage the contact member 38 to complete a circuit through this thermostat at a much lower temperature, for example 50° Fahrenheit.

The manually operable control switch G comprises an arm or handle 39 pivoted at some convenient position in the car, so that it may be shifted to any one of four different positions for determining which of the high, medium or low temperature thermostats shall be in control of the system, or whether the control system shall be rendered entirely inoperative. The controller 39 is secured at the outer end of a rotary shaft 40, on which are mounted a pair of independent, superposed contact bars 41 and 42, separated from one another and from shaft 40, by means of insulation 43. One down-turned end 44 of contact plate 41 makes contact in all positions of the switch with a fixed arcuate contact plate 45. Plate 45 is formed with three equally spaced studs or projections 46, over which the spring contact 44 must snap in moving from one position to another. These studs 46 serve to hold the switch yieldably in each of its four operating positions. The other down-turned end 47 of contact plate 41 is adapted to continuously make contact with an arcuate plate 48 when the switch is in either of the high, medium or low positions, and to move onto a separate contact 49 when the switch is moved to the "off" position. One end 50 of the inner contact bar 42 is always in contact with the arcuate contact plate 51, in all four positions of the switch. The other end 52 of contact bar 42 is adapted to alternatively engage with the four spaced fixed contacts 53, 54, 55 and 56. The end contacts 53 and 56 have no electrical connection and merely serve as rests for the movable contact 52 when the switch is in the high or off positions, respectively. Contact 54 is connected by wire 57 with contact 36 of the intermediate thermostat 30, and contact 55 is connected by wires 58 and 59 to the fixed contact 38 of low temperature thermostat 31.

The relay H comprises an electro-magnet 60, which when energized will draw up the armature 61 and complete a circuit through contacts 61' and 62, whereby the low temperature thermostat 31 will be placed in control of the heating system.

The safety switch J comprises a bimetallic bar 63, surrounded by a heating coil 63′, one terminal of which is connected by a wire 63″ with a contact 64 normally in engagement with a spring contact 64′. A latch 65 at the free end of the bimetallic bar normally holds a plunger 66 in engagement with the spring contact 64′, thus holding this spring contact against the fixed contact 64. Prolonged passage of current, or the passage of an unusually heavy current through the coil 63′ will cause the bimetallic bar 63 to warp and withdraw the latch 65 from engagement with plunger 66, whereupon the spring contact 64′ will move away from the fixed contact 64, thus breaking the circuit through the device. This circuit breaker only operates under abnormal conditions, and need not be further considered in connection with the operation of the present control systems. This thermally operated switch or circuit breaker is described more in detail and claimed in the patent granted Dec. 22, 1925, to Parks and Van Vulpen, No. 1,566,918.

The automatic selector switch K comprises a casing 67 in which is mounted a Bourdon tube 68, preferably of the shape and cross section indicated in Figs. 5 and 6. The free end 69 of this tube is closed, and the other end is mounted on and is in communication with the pipe 70, leading to the air line S. Three similar spring contacts 71, 72 and 73 are mounted in parallel relation on an insulating block 74 within casing 67. A swinging contact plate 75 mounted on insulating block 76, is adapted to bridge these three contacts 71, 72 and 73, when in the position shown in Figs. 5 and 6. When swung up to the position indicated in Fig. 1, the plate 75 will be out of contact with the several spring contacts 71, 72 and 73, so that there will be no electrical connection between any two of these contacts. The insulating block 76 which carries movable contact 75 is mounted on a plate 77 which is pivoted on the fixed post 78. Plate 77 has at one side a triangular projection 79 adapted to be engaged by a roller 80 mounted in the free end of a link 81, pivoted at 82 on a bell crank 83, which is mounted on a fixed pivot 84. Link 81 is constantly urged toward the right in Fig. 5 by means of the contraction spring 85, one end of which is secured to the link 81 and the other to a fixed portion of the supporting framework. A link 86, whose length is adjustable at 87, is connected at one end 88 to the free end 69 of the Bourdon tube 68, and is adjustably connected at its other end 89 within a slot 90, in one arm of bell crank 83. When the car is out of service and the air pressure in pipe 70 and Bourdon tube 68 is dissipated, this tube will contract so that the free end 69 will move inwardly and downwardly and the parts of the switch mechanism will assume the positions shown in Figs. 5 and 6. The roller 80 will be in engagement with the upper inclined surface of projection 79 and will hold the bridge plate 75 in engagement with the spring contacts 71, 72 and 73. When super-atmospheric air pressure is returned to the pipe 70, the tube 68 will tend to straighten and will pull up on the link 86, swinging bell crank 83 in a counter clockwise direction and drawing down the link 81, the roller 80 moving downwardly and to the left, along the inclined surface of projection 79 until it passes the pointed end of this projection. The spring 85 will then draw the roller to the right along the downwardly inclined surface of projection 79, thus quickly rotating the plate 77 in a clockwise direction and quickly swinging the bridge plate 75 out of contact with the spring contacts 71, 72 and 73. This position of the parts is indicated in Fig. 1. When the air pressure is released from pipe 70 and Bourdon tube 68, a reversal of these movements will take place and the contact plate 75 will be quickly snapped back into the position shown in Figs. 5 and 6, so that the contacts 71, 72 and 73 are again placed in electrical connection with one another.

Under certain conditions, it is desirable (for reasons which will appear hereinafter) to break the electrical connection between spring contact 73 and bridge plate 75 without disturbing the connection between contacts 71 and 72 and the plate 75. Accordingly, means are provided for independently pushing back the spring contact 73 out of contact with plate 75 when the parts are in the positions shown in Figs. 5 and 6. A plate 91 pivoted on the post 78 carries a block of insulating material 92, which, when the plate is swung in a clockwise direction from the position shown in Figs. 5 and 6, engages the spring contact 73 and pushes it back to the position shown in dotted lines in Fig. 6 and out of contact with the bridge plate 75. An oppositely extending arm 93 of plate 91 has a slotted portion 94 into which extends a pin or post 95 extending from the supporting frame for limiting the arcuate swinging movement of the plate. A second spring arm 96, extending from arm 93, has a curved or humped portion 97 adapted to snap over the top of a fixed pin 98 and hold the plate 91 in its operative position, that is the position in which the spring contact 73 is pushed back out of contact with plate 75. A coil spring 99, having one end fixed and the other end engaging the arm 93, tends to swing the plate 91 into the inoperative position shown in Fig. 5. The engagement of the spring clamp 97 with the post 98 is, however, sufficient to hold the releasing member in its opposite or operative position against the action of spring 99. An operating knob or handle 200 is secured centrally to the plate 91 and extends out through the cover plate of casing 67 so that it may be manually grasped to swing the releasing plate 91 to either of its two positions. The mechanism just described constitutes an emergency switch which is operated when the car is out of service, if it is desired to heat the car to one of the higher temperatures.

The wires 100 and 101 which form extensions of the positive and negative leads from the source of power extend through each of the several compartments in the car. A second pair of wires 102, 103 also lead through each of the car compartments. Positive lead 100 is connected by wire 104 with the intermediate spring contact 72 of selector switch K, and is connected by a wire 105 in each compartment with the arcuate contact plate 48 of the control switch G. Negative lead 101 is connected in each compartment through wire 106 and fuse 107 with the binding post 108. Wire 102 is connected at one end with spring contact 71 of selector switch K, and at its other end by branch wires 109 with the "off" contact 49 of each manual control switch G. Wire 103 leads from the spring contact 73 of selector switch K through a branch 110 to the coil 60 of the relay H in each compartment.

The operation of one of the individual car compartment controlling systems will now be described, referring first, by way of example, to the compartment N, as shown in Fig. 1. As there shown, the car is in service in a train, and the control switch G is set for high temperature operation, that is, so that the car compartment temperature will be maintained at a normal temperature of occupancy, for example, 72°. As shown, the temperature has fallen slightly below normal, and the valve A has been moved to supply heating medium to the radiators. Operative air pressure is present in the car train pipes, and the selector switch K has been moved to the open position, as shown. A circuit is now established through relay E, as follows: Circuit No. 1. From positive main 100 through wire 105, contact plate 48, switch plate 41, plate 45, wire 111, fuse 112, wire 113, binding post 114, resistance 115, binding post 116, wire 117, coil 23 of relay E, wire 118, binding post 119, resistance 120, wire 121, binding post 122, wire 123 to spring contact 64' of thermo-switch J, contact 64, wire 63'', coil 63', wire 124 to binding post 108, and thence through fuse 107 and wire 106 to the negative main 101. At this time the armature 24 has been raised so as to complete a circuit through contacts 25 and 26, leading to the motor B, but this circuit is not complete at this time, since the movable contact 13 of limit switch D has been moved away from the fixed contact 15.

When the temperature of the compartment has reached the desired point, for example, 72° Fahrenheit, the mercury column 33 of high temperature thermostat 29 will reach the fixed contact 34, and a circuit is now completed through this thermostat, as follows: Circuit No. 2. Circuit No. 1 to binding post 116, wire 32, mercury column 33, contact 34, wire 125, binding post 126, wire 127, to binding post 119 and thence over circuit No. 1 to the negative lead. It will be noted that this circuit forms a shunt across binding posts 116 and 119 around the coil of relay E, so that the electro-magnet 23 will be deenergized and will permit the armature 24 to drop, thus breaking the circuit through contacts 25 and 26 and bringing movable contact 27 into engagement with fixed contact 28. A circuit is now established through valve operating motor C, as follows: Circuit No. 3. From the positive main over circuit No. 1 to binding post 114, wire 128, armature 24, contact 27, contact 28, wire 21, solenoid coil C, wire 18, contacts 14 and 13 of limit switch D, wire 22 to binding post 122, and thence over circuit No. 1 to the negative main. Solenoid C will now be energized and will draw the valve lever 3 over to its opposite position so as to shut off the flow of steam to the radiators. As the movement of the valve operating lever 3 is completed, the limit switch B will be operated so as to snap the movable contact 13 away from switch contact 14 and into engagement with fixed contact 15, thus breaking circuit No. 3 and once more deenergizing solenoid C.

When the temperature of the compartment has fallen below the desired normal condition, mercury column 33 will move down out of contact with fixed contact 34 and break circuit No. 2, so that circuit No. 1 is again operative to energize the relay E, and again raise the armature 24 and bring movable contact 25 into engagement with fixed contact 26. A circuit is now completed through the operating motor B, as follows: Circuit No. 4. From the positive main through circuit No. 3 to armature 24, contacts 25 and 26, wire 20, coil of solenoid B, wire 19, contacts 15 and 13 of limit switch D, wire 22 and thence over circuit No. 3 to the negative main. Solenoid B will now be energized to throw the valve lever 3 back to the position shown in compartment N and again open the valve. At the completion of this movement, movable contact 13 of limit switch D is again snapped back from contact 15 into engagement with contact 14, thus breaking the operating circuit No. 4 for motor B. Steam is now again allowed to flow to the radiators, and will continue to flow until the temperature is once more at the desired normal, when thermostat 29 will again complete circuit No. 2 and the cycle of operations previously described will be repeated.

If, for any reason, a somewhat lower temperature is desired, manually operated switch G is moved to the intermediate or medium position. This brings contact 52 of plate 42 into engagement with fixed contact 54, but makes no material change in the other three contact arms of this switch. A circuit will now be completed through the intermediate temperature thermostat 30, as follows: Circuit No. 5. From the positive main over circuit No. 2 to wire 32, mercury column 35, fixed contact 36, wire 57, contact 54, plates 52, 42, 50 of switch G, fixed contact plate 51, wire 129 to binding post 119, and thence over circuits No. 1 or No. 2 to the negative main. This circuit will deenergize the relay E in the same manner that the high temperature thermostat 29 operated, and circuit No. 3 will be completed to close the valve A. The operation of the valve to open and closed positions will be the same as previously described except that the temperature will not be allowed to rise above the point for which intermediate thermostat 30 is adjusted. Similarly, if for any reason the occupants of the compartment should desire to have the temperature maintained at the lowest temperature permitted, for example, 50° Fahrenheit, the control switch G will be moved to the "low" position thus bringing contact arm 52 onto the fixed contact member 55. A circuit is now established through the low temperature thermostat 31, as follows: Circuit No. 6. From the positive main over circuit No. 2 through wire 32, mercury column 37, fixed contact 38, wire 59, wire 58, contact 55, contact plate 42 of switch G, contact 51, and thence as in circuit No. 5 back to the negative main. The circuit thus established will deenergize the relay E and the steam will be shut off until the temperature has fallen below the point for which the low temperature thermostat 31 is adjusted. After this the temperature of the compartment will be regulated by this low temperature thermostat in the same manner as described above for the high and intermediate temperatures.

If for any reason, while the car is in service, it should be desired to throw the automatic control system entirely out of operation, the control switch G is moved to the "off" position illustrated in compartment O of Fig. 1, thus moving the contact 47 out of engagement with the fixed contact plate 48 and into engagement with the fixed contact 49. It will be noted that all of the operating circuits heretofore described pass from the positive main through fixed contact 48 to the movable contact 47, and all of these circuits will be broken by the shifting of the movable contact 47 over onto the fixed contact 49. Wires 109 and 102 lead from fixed contact 49 to the spring contact 71 of selector K, which is now dead, so that no new circuits are completed at this time. The radiators may now be regulated by hand, for example, by manual manipulation of the valve lever 3 by means of handle 130, and the steam may be left either on or off without any control being exercised by the thermostats. For example, in compartment O the steam is left "on" although the temperature has risen to a point above that at which all three of the thermostats operate to shut off the steam. In the same manner the switch A might be shut off and remain off, no matter how far the temperature drops.

All of the above presupposes that the car remains in service as a unit of the train, but if the car is disconnected from the train and connected up with the stationary steam supply U in the train yards, different conditions will control. Let us suppose that the manual controllers G in compartments N and O are left in the respective positions shown in Fig. 1, but the car is disconnected from the train and connected with the stationary source of steam supply U in the train yards. The super-atmospheric pressure is now dissipated from the air train lines, and the selector switch K will be operated to move the bridge plate 75 to closed position, as shown in Figs. 2, 3, 5 and 6. For any of the compartments whose control switch G have been left in the "off" position, an auxiliary motor operating circuit is now completed, as follows: Circuit No. 7. From positive main 100 through wire 104, spring contact 72, bridge plate 75, spring contact 71, wire 102, wire 109, fixed contact 49, movable contact plates 47, 41 and 44 of switch G to the fixed contact plate 45, and thence over either circuit 3 or 4, as already described. This condition will prevail in the compartment O, as shown in Fig. 1. If switch G is left in either the high, intermediate or low position, (for example the high position indicated in compartment N of Fig. 1), this auxiliary circuit will not be completed, but is unnecessary, since the original circuit from the positive main is still complete through contact plate 48. At the same time an energizing circuit for relay H is completed, as follows: Circuit No. 8. From the positive main through wire 104, spring contact 72, bridge plate 75, spring contact 73, wire 103, wire 110, coil 60 of relay H, wire 131, to binding post 108 and thence over circuit No. 1 to the negative main. This establishes an operating circuit through the low temperature thermostat, as follows: Circuit No. 9. By circuit No. 6 (or 7) through thermostat 31 and wire 59, wire 132, contact 62, contact 61', armature 61 of relay H, wire 133, to binding post 126, wire 127 to binding post 119, and thence over circuit No. 1 to the negative main. No matter what the position of manual control switch G may be, this auxiliary operating circuit through the low temperature thermostat will be completed when the car is out of service, and selector switch K is moved to the position shown in Fig. 2. In the case of compartment N, as shown in Fig. 1, the valve A will be moved to closed position and the steam will remain off until the temperature falls low enough to break circuit No. 9 to the low temperature thermostat, after which circuits Nos. 1 and 4 will be consecutively completed to open the valve A, and after this the valve will be alternately opened and closed, as hereinabove described, to maintain the car at the specified low temperature. It will be noted that the low temperature 31 remains in control despite the fact that manual control switch G has been left in "high" position.

In the case of compartment O, as shown in Fig. 1, manual switch G has been left in "off" position but the steam has been left turned on by means of hand valve 130. Circuit No. 3 will first be closed to move the valve A to closed position, and the parts will remain in this position until the temperature has fallen low enough to break circuit No. 9 so that relay E may again be energized to close circuit No. 4 and again open the valve A. If the steam had been left turned off in compartment O and the temperature had fallen below the minimum for which thermostat 31 is set, the first effect would have been to close the circuit No. 4 and open valve A. In either case, the temperature will be maintained at the low temperature (for example 50°) for which thermostat 31 is adjusted, the same as in the compartment N, and this despite the fact that manual control switch G has been left in the "off" position.

It is sometimes desirable when the car is out of service, and the selector switch K is in the position illustrated in Fig. 2, to heat the car to a higher temperature, as for example, just before the car is to be put into service, but before it is coupled up with the train. This may be accomplished by first swinging the emergency switch 200 (Fig. 6) in a clockwise direction so as to swing the plate 91 into engagement with spring contact 73 and push this contact back out of engagement with the bridge plate 75. This breaks circuit No. 8 and deenergizes the relay H, as indicated in Fig. 3, so that the automatic control of the compartments by means of the low temperature thermostat 31 is no longer effective. Controller G may now be moved to either the intermediate or high position and the temperature will now be regulated by either the thermostat 30, or the thermostat 29, exactly as under normal operating conditions.

To recapitulate, it will thus be seen that with this improved control system the following different operations are possible: (1) When the car is in service, each compartment thereof may be automatically and individually maintained at any one of a plurality of different temperatures, by suitably manipulating an accessible control switch in the compartment. Although only three different temperatures are here provided for, obviously any desired number could be provided for by adding additional thermostats in the same manner as those here illustrated. (2) The automatic control system for any of the compartments may be thrown entirely out of operation without affecting the operations in any other compartment. (3) When the car is out of service, the low temperature control system will be automatically thrown into operation in all of the several compartments, regardless of the position of the manual control switch, that is, if this switch is left in high, intermediate or low position, or even if it is turned to "off" position so that the automatic control system is entirely inoperative while the car is in service. (4) When the car is out of service, the high temperature controls may be returned to service by manual manipulation of the emergency button 200 of selector switch K, and the subsequent movement of the several manual control switches G in the several compartments to the temperature desired in each of the compartments.

We claim:

1. The combination with a railway car and power supply lines thereon which are connected with train power sources when the car is connected in service as a unit of a train, of a car heating system including electrically operated regulating means for maintaining the car at any one of a plurality of selected temperatures, a manually operable control switch for setting the regulating means to maintain any one of the temperatures or for breaking the operating circuits to make the regulating means ineffective when the car is connected in service as a unit of a train, and an automatically operated switch under control of a power line on the car for rendering the regulating means effective when the car is out of service and the manually operated control switch has been set to make the regulating means ineffective.

2. The combination with a railway car and power supply lines thereon which are connected with train power sources when the car is connected in service as a unit of a train, of a car heating system including electrically operated regulating means for maintaining the car at any one of a plurality of selected temperatures, a manually operable control switch for setting the regulating means to maintain any one of the temperatures or for breaking the operating circuits to make the regulating means ineffective when the car is connected in service as a unit of a train, and an automatically operated switch under control of a power line on the car for rendering the regulating means effective to maintain the car at a predetermined temperature when out of service regardless of the adjustment of the manual control switch, and manually operable means for varying the setting of the automatic switch, so that the temperature may be adjusted by changing the setting of the manual control switch when the car is out of service.

3. The combination with a car heating system including regulating means for automatically maintaining the car at any one of a plurality of selected temperatures, and a pipe on the car which contains air under pressure only when the car is connected in service as a unit of a train, of a manually operable controller on the car movable to different positions for setting the regulating means to maintain any selected one of the temperatures or for throwing the regulating means entirely out of control of the heating system as long as service pressure exists in the pipe, and automatic means controlled from the air pipe for rendering the manual controller ineffective when the service pressure is released.

4. The combination with a car heating system including regulating means for automatically maintaining the car at any one of a plurality of selected temperatures, and a pipe on the car which contains air under pressure only when the car is connected in service as a unit of a train, of a manually operable controller on the car movable to different positions for setting the regulating means to maintain any selected one of the temperatures or for throwing the regulating means entirely out of control of the heating system as long as service pressure exists in the pipe, and means for automatically setting the regulating means to maintain the car at a predetermined temperature when service pressure is absent from the pipe regardless of the position of the manually operable controller.

5. The combination with a car heating system including regulating means for automatically maintaining the car at any one of a plurality of selected temperatures, and a pipe on the car which contains air under pressure only when the car is connected in service as a unit of a train, of a manually operable controller on the car movable to different positions for setting the regulating means to maintain any selected one of the temperatures or for throwing the regulating means entirely out of control of the heating system as long as service pressure exists in the pipe, means for automatically setting the regulating means to maintain the car at a predetermined temperature when service pressure is absent from the pipe regardless of the position of the manually operable controller, and means for rendering the last mentioned means ineffective so that changing the setting of the manually operable controller will be effective to adjust the temperature when the service pressure is absent.

6. The combination with a car heating system including regulating means for automatically maintaining the car at any one of a plurality of selected temperatures, and a pipe on the car which contains air under pressure only when the car is connected in service as a unit of a train, of a manually operable controller on the car movable to different positions for setting the regulating means to maintain any selected one of the temperatures or for throwing the regulating means entirely out of control of the heating system as long as service pressure exists in the pipe, and a pressure operated selector for automatically setting the regulating means to maintain the car at a predetermined temperature when service pressure is absent from the pipe regardless of the setting of the manually operable controller.

7. The combination with a car heating system including regulating means for automatically maintaining the car at any one of a plurality of selected temperatures, and a pipe on the car which contains air under pressure only when the car is connected in service as a unit of a train, of a manually operable controller on the car movable to different positions for setting the regulating means to maintain any selected one of the temperatures or for throwing the regulating means entirely out of control of the heating system as long as service pressure exists in the pipe, a pressure operated selector for automatically setting the regulating means to maintain the car at a predetermined temperature when service pressure is absent from the pipe regardless of the setting of the manually operable controller, and manually operated means for rendering the selector partially ineffective so that the temperature may be adjusted by changing the setting of the manually operable controller when service pressure is absent.

8. The combination with a car heating system including electrically operated regulating means for automatically maintaining the car at any one of a plurality of selected temperatures, and a pipe on the car which contains air under pressure only when the car is connected in service as a unit of a train, of a manually operable control switch for setting the regulating means to maintain any one of the temperatures or for entirely breaking the operating circuits to make the regulating means ineffective when the car is in service and service pressure exists in the pipe, and a pressure operated switch automatically controlled from the pipe for making the regulating means effective when service pressure is absent, and the manual control switch has been set to make the regulating means ineffective.

9. The combination with a car heating system including electrically operated regulating means for automatically maintaining the car at any one of a plurality of selected temperatures, and a pipe on the car which contains air under pressure only when the car is connected in service as a unit of a train, of a manually operable control switch for setting the regulating means to maintain any one of the temperatures or for breaking the operating circuits to make the regulating means ineffective when the car is in service and service pressure exists in the pipe, and a pressure operated switch automatically controlled from the pipe for making the regulating means effective to maintain the car at one predetermined temperature when the service pressure is absent, regardless of the setting of the manual control switch.

10. The combination with a car heating system including electrically operated regulating means for automatically maintaining the car at any one of a plurality of selected temperatures, and a pipe on the car which contains air under pressure only when the car is connected in service as a unit of a train, of a manually operable control switch for setting the regulating means to maintain any one of the temperatures or for breaking the operating circuits to make the regulating means ineffective when the car is in service and service pressure exists in the pipe, and a pressure operated switch automatically controlled from the pipe for making the regulating means effective to maintain the car at a predetermined temperature when the service pressure is absent, regardless of the setting of the manual control switch, and manually operable means for varying the setting of the pressure operated switch, whereby the temperature may be adjusted by changing the setting of the manual control switch when the service pressure is absent from the pipe.

11. The combination with a railway car comprising a plurality of separate compartments, and power supply lines on the car which are connected with train power sources when the car is connected in service as a unit of a train, of a car heating system including electrically operated regulating means for controlling the temperatures of the several compartments, a manually operable control switch for each compartment for setting the regulating means of that compartment to maintain any one of a plurality of selected temperatures or for breaking the operating circuits for that compartment to render the regulating means for that compartment ineffective while the car is connected in service as a unit of a train, and an automatically operated switch under control of a power line on the car for rendering the regulating means in all compartments effective when the car is out of service.

12. The combination with a railway car comprising a plurality of separate compartments, and power supply lines on the car which are connected with train power sources when the car is connected in service as a unit of a train, of a car heating system including electrically operated regulating means for controlling the temperatures of the several compartments, a manually operable control switch for each compartment for setting the regulating means of that compartment to maintain any one of a plurality of selected temperatures or for breaking the operating circuits for that compartment to render the regulating means for that compartment ineffective while the car is connected in service as a unit of a train, and an automatically operated switch under control of a power line on the car for rendering the regulating means in all compartments effective to maintain each compartment at a predetermined temperature when out of service regardless of the settings of the several manual control switches.

13. The combination with a railway car comprising a plurality of separate compartments, and power supply lines on the car which are connected with train power sources when the car is connected in service as a unit of a train, of a car heating system including electrically operated regulating means for controlling the temperatures of the several compartments, a manually operable control switch for each compartment for setting the regulating means of that compartment to maintain any one of a plurality of selected temperatures or for breaking the operating circuits for that compartment to render the regulating means for that compartment ineffective while the car is connected in service as a unit of a train, and an automatically operated switch under control of a power line on the car for rendering the regulating means in all compartments effective to maintain each compartment at a predetermined temperature when out of service regardless of the settings of the several manual control switches, and manually operable means for varying the setting of the automatic switch, so that the temperature in any compartment may be adjusted by changing the setting of the manual control switch in that compartment when the car is out of service.

14. The combination with a railway car comprising a plurality of separate compartments, a heating system therefor comprising a separate control system for each compartment, and a pipe on the car which contains air under pressure only when the car is in service as a unit of a train, of a manually operable controller for each compartment for setting the control system to maintain that compartment at any one of a plurality of selected temperatures, or for throwing the control system of that compartment entirely out of operation as long as service pressure exists in the pipe, and automatic means controlled from the air pipe for rendering the manual controller ineffective when the service pressure is released.

15. The combination with a railway car comprising a plurality of separate compartments, a heating system therefor comprising a separate control system for each compartment, and a pipe on the car which contains air under pressure only when the car is in service as a unit of a train, of a manually operable controller for each compartment for setting the control system to maintain that compartment at any one of a plurality of selected temperatures, or for throwing the control system of that compartment entirely out of operation as long as service pressure exists in the pipe, and means controlled from the air pipe for automatically setting the control systems to maintain all of the car compartments at a predetermined temperature when service pressure is absent from the pipe regardless of the positions of any one or more of the manual controllers.

16. The combination with a railway car comprising a plurality of separate compartments, a heating system therefor comprising a separate control system for each compartment, and a pipe on the car which contains air under pressure only when the car is in service as a unit of a train, of a manually operable controller for each compartment for setting the control system to maintain that compartment at any one of a plurality of selected temperatures, or for throwing the control system of that compartment entirely out of operation as long as service pressure exists in the pipe, means controlled from the air pipe for automatically setting the control systems to maintain all of the car compartments at a predetermined temperature when service pressure is absent from the pipe regardless of the positions of any one or more of the manual controllers, and means for rendering the last mentioned means ineffective so that changing the setting of the manually operable controller in any compartment will be effective to adjust the temperature of that compartment when the service pressure is absent.

17. The combination with a railway car comprising a plurality of separate compartments, a heating system therefor comprising a separate control system for each compartment, and a pipe on the car which contains air under pressure only when the car is in service as a unit of a train, of a manually operable controller for each compartment for setting the control system to maintain that compartment at any one of a plurality of selected temperatures, or for throwing the control system of that compartment entirely out of operation as long as service pressure exists in the pipe, and a pressure operated selector controlled from the pipe for setting the control systems to maintain all of the car compartments at a predetermined temperature when service pressure is absent from the pipe regardless of the settings of any of the manually operable controllers.

18. The combination with a railway car comprising a plurality of separate compartments, a heating system therefor comprising a separate control system for each compartment, and a pipe on the car which contains air under pressure only when the car is in service as a unit of a train, of a manually operable controller for each compartment for setting the control system to maintain that compartment at any one of a plurality of selected temperatures, or for throwing the control system of that compartment entirely out of operation as long as service pressure exists in the pipe, a pressure operated selector controlled from the pipe for setting the control systems to maintain all of the car compartments at a predetermined temperature when service pressure is absent from the pipe regardless of the settings of any of the manually operable controllers, and manually operable means for rendering the selector partially ineffective so that the temperature of any one of the compartments may be adjusted by changing the setting of the manually operable controller when the service pressure is absent.

19. The combination with a railway car comprising a plurality of separate compartments, a heating system therefor comprising a separate electrically operated control system for each compartment for automatically maintaining the compartment temperature at any one of a plurality of selected temperatures, and a pipe on the car which contains air under pressure only when the car is connected in service as a unit of a train, of a manually operable control switch in each compartment for setting the control system to maintain any one of the selected temperatures or for breaking the operating circuits to make the automatic control system ineffective when the car is in service and service pressure exists in the pipe, and a pressure operated switch on the car and controlled from the pipe for making the automatic control means in each compartment effective when service pressure is absent.

20. The combination with a railway car comprising a plurality of separate compartments, a heating system therefor comprising a separate electrically operated control system for each compartment for automatically maintaining the compartment temperature at any one of a plurality of selected temperatures, and a pipe on the car which contains air under pressure only when the car is connected in service as a unit of a train, of a manually operable control switch in each compartment for setting the control system to maintain any one of the selected temperatures or for breaking the operating circuits to make the automatic control system ineffective when the car is in service and service pressure exists in the pipe, and a pressure operated switch on the car and controlled from the pipe for making the automatic control means effective to maintain each of the compartments at a predetermined temperature when the service pressure is absent, regardless of the settings of the several manual control switches.

21. The combination with a railway car comprising a plurality of separate compartments, a heating system therefor comprising a separate electrically operated control system for each compartment for automatically maintaining the compartment temperature at any one of a plurality of selected temperatures, and a pipe on the car which contains air under pressure only when the car is connected in service as a unit of a train, of a manually operable control switch in each compartment for setting the control system to maintain any one of the selected temperatures or for breaking the operating circuits to make the automatic control system ineffective when the car is in service and service pressure exists in the pipe, and a pressure operated switch on the car and controlled from the pipe for making the automatic control means effective to maintain each of the compartments at a predetermined temperature when the service pressure is absent, regardless of the settings of the several manual control switches, and manually operable means for varying the setting of the pressure operated switch, so that the temperature of any compartment may be adjusted by changing the setting of the manually operable control switch therein, when the service pressure is absent from the pipe.

PAUL B. PARKS.
DONALD W. MILLER.